(12) United States Patent
Koeder

(10) Patent No.: US 9,007,007 B2
(45) Date of Patent: Apr. 14, 2015

(54) HANDHELD MACHINE TOOL

(71) Applicant: Thilo Koeder, Bayan Lepas (MY)

(72) Inventor: Thilo Koeder, Bayan Lepas (MY)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 13/714,793

(22) Filed: Dec. 14, 2012

(65) Prior Publication Data
US 2013/0162188 A1 Jun. 27, 2013

(30) Foreign Application Priority Data
Dec. 22, 2011 (DE) .......................... 10 2011 089 673

(51) Int. Cl.
H02K 17/32 (2006.01)
H02P 31/00 (2006.01)
B23B 45/00 (2006.01)
B25F 5/02 (2006.01)

(52) U.S. Cl.
CPC .............. *H02P 31/00* (2013.01); *B23B 45/001* (2013.01); *B23B 2260/122* (2013.01); *B23B 2260/128* (2013.01); *B25F 5/026* (2013.01)

(58) Field of Classification Search
USPC .......... 318/434, 433, 432, 671, 560; 451/456; 30/276
See application file for complete search history.

(56) References Cited

U.S. PATENT DOCUMENTS

| 4,066,133 A * | 1/1978 | Voss ............................... 173/182 |
| 7,628,683 B2 * | 12/2009 | Hofmann et al. ............. 451/456 |
| 2006/0248992 A1 * | 11/2006 | Reynertson ..................... 81/479 |
| 2008/0141541 A1 * | 6/2008 | Hurley ........................... 30/276 |

FOREIGN PATENT DOCUMENTS

DE  10 2009 047 394  6/2011

* cited by examiner

*Primary Examiner* — Karen Masih
(74) *Attorney, Agent, or Firm* — Kenyon & Kenyon LLP

(57) ABSTRACT

A handheld machine tool has a drive motor and a supplementary handle which is mounted on the housing of the handheld machine tool and is assigned a drive-torque limitation device, the drive-torque limitation device limiting the drive torque to a torque level below a maximum torque if the supplementary handle is not mounted on the housing.

8 Claims, 1 Drawing Sheet

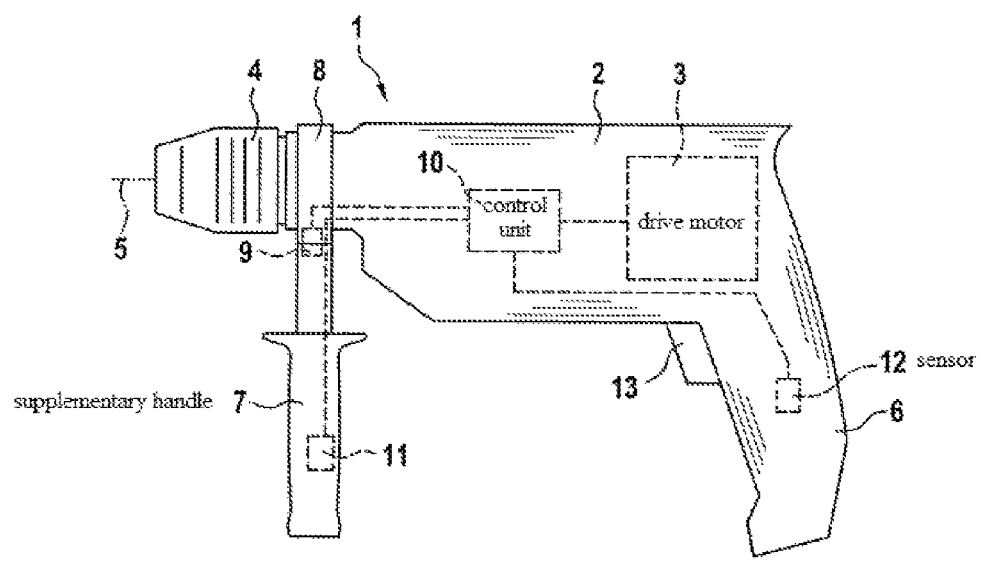

HANDHELD MACHINE TOOL

BACKGROUND OF THE INVENTION

1. Field of the Invention

The present invention relates to a handheld machine tool having a drive motor and a supplementary handle which is mountable on the housing of the handheld machine tool.

2. Description of the Related Art

From published German patent application document DE 10 2009 047 394 A1, a handheld machine tool is known, which is equipped with a supplementary handle, to be mounted on the housing if needed. Situated on the supplementary handle are two electrically conductive contact elements, which are set apart from each other and part of a current circuit, whose capacity changes when the user grips the supplementary handle. The capacity change is detected by a detection device and wirelessly transmitted to an evaluation unit in the handheld machine tool. If the evaluation unit detects that the user is gripping the supplementary handle incorrectly, the maximum drive output of the electrical drive motor in the handheld machine tool will be reduced.

BRIEF SUMMARY OF THE INVENTION

The present invention is based on the objective of increasing the operating safety for handheld machine tools equipped with a mountable supplementary handle.

The handheld machine tool according to the present invention, such as a power drill, has a drive motor inside a housing, which drives a tool when in operation. The housing is equipped with a handle for gripping and guiding the handheld machine tool during operation. In addition, the handheld machine tool has a supplementary handle, which, however, is not permanently mounted on the housing, but may be fixed in place on the housing as needed. A drive-torque limitation device is assigned to the supplementary handle, which limits the drive torque output by the drive motor when the supplementary handle is not mounted on the housing. The limitation of the drive or motor torque is made to a torque level that lies below the maximum torque able to be delivered by the drive motor. This ensures that the handheld machine tool is able to be operated at maximum torque only when the supplementary handle is mounted on the housing. On the other hand, if the supplementary handle is not mounted on the housing, or if it is mounted incorrectly, the drive motor is able to generate and output only a reduced torque, which leads to correspondingly lower reaction forces and torques that act on the handheld machine tool during the machining of workpieces and must be absorbed by the user via the handles. However, if the supplementary handle is properly mounted on the housing, the torque development of the drive motor is enabled up to a maximum torque. Conceivable in this context are developments in which the maximally possible torque of the drive motor with a correctly mounted supplementary handle is not restricted, so that the drive-torque limitation device need not become active. However, there are also potential developments, in which a high torque level is activated or actively enabled via the drive-torque limitation device; however, this torque level lies below the maximally possible drive torque.

Basically, different types of drive-torque limitation devices are conceivable. According to one advantageous development, the drive-torque limitation device includes a sensor system, via which the position of the supplementary handle in the mounted-on-the-housing state is detectable, and if the supplementary handle is not mounted on the housing, or is not mounted correctly, the drive torque of the drive motor is electronically restricted to a reduced torque level that lies below the maximum value. In principle, the sensor system may be situated on the housing and detect an affixation of the supplementary handle, e.g., by locking into a click-stop device. This development has the advantage that the detection of the correct mounting on the housing basically requires no sensors on the supplementary handle itself.

According to one further advantageous development, the drive-torque limitation device has a torque coupling, which is switchable between different states when the supplementary handle is mounted on the housing. The torque coupling is set up in such a way, in particular, that the drive torque of the motor is reduced to a restricted value when the supplementary handle is not mounted. When the supplementary handle is correctly fixed in place on the housing, the torque coupling is switched over, whereupon the torque restriction of the drive motor is canceled and a higher maximum torque value of the drive motor is enabled.

According to one further useful development, the supplementary handle is provided with at least one sensor, which is used to determine the gripping of the supplementary handle by the user. If the sensor signal supplied by the sensor is outside a defined value range, or if no sensor signal exists, then the motor torque is restricted. Otherwise, i.e., when the user grips the supplementary handle in the correct manner, there is no restriction of the motor torque, or a higher maximum torque is allowed for the motor torque.

The sensor is advantageously positioned or developed on the supplementary handle in such a way that a sensor signal which leads to a maximum value of the drive torque is generated only if the user grips the supplementary handle in a defined manner. This is to prevent that a maximum torque is delivered when the user holds the supplementary handle incorrectly, which entails the risk that the reaction or support forces during the machining of the workpiece are unable to be absorbed by the user. It may be useful to provide at least two sensors on the supplementary handle, which are situated in a certain position on the supplementary handle or in a certain position in relation to each other, in order to be able to determine proper grasping. However, a single sensor or multiple sensors which is/are developed and placed in such a way that correct grasping is detectable is/are another option.

In addition or as an alternative to the sensors on the supplementary handle, one sensor or multiple sensors may also be similarly disposed directly on the housing or on the main handle disposed on the housing, in order to be able to detect the correct grasping of the handle by the user. Corresponding sensors are advantageously situated both on the handle on the housing and also on the supplementary handle, so that it is possible to detect when the handheld machine tool is grasped and guided by both hands.

If appropriate, multiple sensors are disposed on the housing of the handheld machine tool, which offers the advantage of making the motor torque adjustable as a function of the direction of rotation. Depending on the support of the housing by the user, different levels of motor torques may be allowed. If appropriate, the direction of rotation of the motor is taken into account in addition, e.g., in such a way that, depending on the direction of rotation of the motor, the maximum motor torque is allowed only if a defined support by the user is determined via the sensors on the housing and/or on the supplementary handle.

According to a further advantageous development, several different maximum torque levels up to which the drive motor may supply a drive torque are able to be defined, the torque levels being specified or activated based on the position of the supplementary handle and/or the data ascertained by the sensors. Depending on the number of sensors on the housing or on the supplementary handle or, in the event that a torque coupling is provided which is activated by the mounting of the supplementary handle on the housing, different operating situations of the handheld machine tool or different situations may be distinguished with regard to the manner in which the user is grasping the handheld machine tool and guiding it. Each of these differentiable situations may be assigned a defined maximum torque level.

The sensors on the housing or on the supplementary handle are developed as inductive or as tactile sensors, for instance.

BRIEF DESCRIPTION OF THE DRAWING

FIG. 1 shows a view of a handheld machine tool developed as power drill.

DETAILED DESCRIPTION OF THE INVENTION

Handheld machine tool 1 shown in FIG. 1 is a power drill which has an electric drive motor 3 in a housing 2, via which a sketched tool 5, which is accommodated in a tool receiving device 4 implemented as drill chuck, is able to be driven. Housing 2 of handheld machine tool 1 has a main handle 6, which is developed in one piece with the housing. In addition, a supplementary handle 7 is provided, which is optionally linkable to housing 2 on a connection segment 8, which may be part of housing 2. In the linked state, supplementary handle 7 is fixedly joined to housing 2 via connection segment 8. If needed, however, supplementary handle 7 can be detached from housing 2 again. Connection segment 8 for accommodating supplementary handle 7 is situated in the front region of housing 2, adjacent to tool receiving device 4. Main handle 6 is located in the rear region of the housing lying opposite.

The connection between connection segment 8 on housing 2 and supplementary handle 7 is detected by means of a sensor 9. Sensor 9 detects correct mounting of supplementary handle 7 on connection segment 8 and supplies a corresponding signal to a regulation or control device 10, which is assigned to drive motor 3 and controls it. If it is detected by sensor 9 or the regulation or control device 10 that supplementary handle 7 has been mounted correctly on connection segment 8, a maximum torque is enabled for electric drive motor 3 in regulation or control device 10. The maximum torque is an upper torque limit, which is either a motor-specific characteristic value, or a specified upper torque level, which may be a function of additional influencing variables, as the case may be.

On the other hand, if no sensor signal has arrived from sensor 9 or if sensor 9 supplies a signal that lies outside a defined value range, then the maximally enabled drive torque of drive motor 3 is restricted to a lower torque level in regulation or control unit 10. This takes into account that if supplementary handle 7 is in place, the user is able to support higher reaction torques than without the supplementary handle.

In one alternative development, device 9 is not a sensor but a torque coupling, which is implemented in such a way that drive motor 3 is able to generate and supply a maximum torque only if supplementary handle 7 has been mounted correctly, whereas the maximally allowed drive torque is set to a lower torque level if the supplementary handle has not been mounted or has been mounted incorrectly.

Situated inside supplementary handle 7 is at least one additional sensor 11, which communicates with regulation or control unit 10 in the mounted state of supplementary handle 7 on connection segment 8, the sensor data providing information about the grasping of supplementary handle 7 by the user. The data transmission from sensor 11 to regulation or control unit 10 takes place via a data line, for example, which is routed through supplementary handle 7 and, in the installed state, communicates with a corresponding data line in housing 2, which leads to regulation or control unit 10. However, a wireless data transmission from sensor 11 to regulation and control unit 10 is possible as well.

A sensor 12, which is connected to regulation or control unit 10 via a data line, is also connected at main handle 6 of housing 2. Both via sensor 11 and sensor 12, it is possible to ascertain whether the user grasps the handle in question.

If appropriate, multiple sensors are disposed on housing 2 and/or on supplementary handle 7, in order to be able to determine with greater precision the manner in which the handheld machine tool is grasped or supported by the user. This makes it possible, for example, to determine an asymmetrical grasping of the housing and/or the supplementary handle, which leads to an increased or descreased maximally enabled torque level of drive motor 3 as a function of the direction of rotation.

Once supplementary handle 7 has been fastened on connection segment 8 of housing 2 in the correct manner, the desired direction of rotation of electric drive motor 3 has been set and the drive motor has been powered on by actuating operator switch 13, drive motor 3 supplies a drive torque that is restricted to a maximum value, which either corresponds to a fixed value or is specified as a function of the different sensor signals.

What is claimed is:

1. A handheld machine tool, comprising:
   a drive motor;
   a housing;
   a supplementary handle configured to be selectively mounted on the housing; and
   a drive-torque limitation device assigned to the supplementary handle, wherein the drive-torque limitations device limits the drive torque of the drive motor to a torque level below a predefined maximum torque if the supplementary handle is not mounted on the housing,
   wherein:
      the drive-torque limitation device is situated on and/or within the housing;
      the drive-torque limitation device includes a first sensor;
      the first sensor is configured to detect whether the supplementary handle is mounted on the housing or whether the supplementary handle is not mounted correctly; and
      the drive torque of the drive motor is limited to a torque level below the maximum torque if the supplementary handle is not mounted on the housing or is not mounted correctly.

2. The hand-held machine tool as recited in claim 1, wherein the drive-torque limitation device includes a torque coupling which is switchable between different states upon mounting of the supplementary handle on the housing.

3. The hand-held machine tool as recited in claim 1, further comprising:
   at least one second sensor for detecting a grasping of the supplementary handle by a user, wherein the second sensor is disposed on the supplementary handle, and wherein the drive torque is limited to a torque level below the maximum torque if one of (i) a sensor signal generated by the second sensor lies outside a predefined value range, or (ii) no sensor signal from the second sensor is present.

4. The hand-held machine tool as recited in claim 1, further comprising:
   at least one second sensor for detecting a holding of the housing by a user, wherein the second sensor is disposed on the housing, and wherein the drive torque is limited to a torque level below the maximum torque if one of (i) a sensor signal generated by the second sensor lies outside a predefined value range, or (ii) no sensor signal from the second sensor is present.

5. The handheld machine tool as recited in claim 4, wherein the drive torque is adjusted as a function of a direction of rotation of the motor.

6. The handheld machine tool as recited in claim 4, wherein multiple second sensors are disposed on the housing for detecting the holding of the housing by the user.

7. The hand-held machine tool as recited in claim 1, wherein the drive torque of the drive motor is limited to different torque levels as a function of the position of the supplementary handle.

8. The hand-held machine tool as recited in claim 3, wherein the drive torque of the drive motor is limited to different torque levels as a function of the position of the supplementary handle.

\* \* \* \* \*